(12) United States Patent
Ferreira et al.

(10) Patent No.: US 8,907,918 B2
(45) Date of Patent: Dec. 9, 2014

(54) ELECTROCHROMIC TOUCHSCREEN

(75) Inventors: Tiago José Monteiro Baptista Cabral Ferreira, Lisboa (PT); Carlos Alberto Pinheiro Baptista, Freiburg (DE); Inês Domingues da Silva Henriques, Algés (PT)

(73) Assignee: YD Ynvisible, S.A., Cartaxo (PT)

( * ) Notice: Subject to any disclaimer, the term of this patent is extended or adjusted under 35 U.S.C. 154(b) by 391 days.

(21) Appl. No.: 13/387,135

(22) PCT Filed: Jul. 29, 2010

(86) PCT No.: PCT/PT2010/000035
§ 371 (c)(1),
(2), (4) Date: Jun. 8, 2012

(87) PCT Pub. No.: WO2011/014087
PCT Pub. Date: Feb. 3, 2011

(65) Prior Publication Data
US 2012/0242614 A1    Sep. 27, 2012

(30) Foreign Application Priority Data
Jul. 29, 2009  (PT) .......................................... 104696

(51) Int. Cl.
*G06F 3/044* (2006.01)
*G06F 3/041* (2006.01)

(52) U.S. Cl.
CPC .... *G06F 3/0412* (2013.01); *G06F 2203/04103* (2013.01); *G06F 3/044* (2013.01)
USPC .......................... 345/174; 345/156; 178/18.06

(58) Field of Classification Search
CPC ..... G06F 3/041; G06F 3/0412; G06F 3/0416; G06F 3/044
USPC .................................. 345/55, 156, 173–176; 178/18.05–18.07; 359/275; 252/500
See application file for complete search history.

(56) References Cited

U.S. PATENT DOCUMENTS

| | | | |
|---|---|---|---|
| 3,662,105 A | 5/1972 | Hurst et al. ...................... | 178/18 |
| 3,798,370 A | 3/1974 | Hurst ............................... | 178/18 |
| 3,819,252 A | 6/1974 | Giglia ........................ | 350/160 R |
| 6,356,376 B1 * | 3/2002 | Tonar et al. .................... | 359/267 |

(Continued)

FOREIGN PATENT DOCUMENTS

WO       03/079176 A2    9/2003    ............. G06F 3/033

OTHER PUBLICATIONS

Anonymous, "Wheatstone Bridge", Wikipedia, http://en.wikipedia.org/w/index.php?title=Wheatstone_bridge&oldid=30808450; 2 pages, Dec. 10, 2005.

(Continued)

*Primary Examiner* — Joe H Cheng
(74) *Attorney, Agent, or Firm* — King & Spalding L.L.P.

(57) ABSTRACT

The present invention relates to a touchscreen, comprising an electronic visualization structure made of a deposition of layers of: electrically conductive material; on which is deposited electrochromic material; on which is deposited electrolyte material; on which is deposited electrochemically active material, on which is deposited electrically conductive material, wherein the electronic visualization structure is simultaneously an electronic touch detection structure, which touch detection depends on the continuous application of a modulated electrical stimuli; and operates based on variations in the electric capacity of the electronic structure.

11 Claims, 7 Drawing Sheets

(56) References Cited

U.S. PATENT DOCUMENTS

| | | | |
|---|---|---|---|
| 7,593,004 B2 * | 9/2009 | Spath et al. | 345/174 |
| 7,755,615 B2 * | 7/2010 | Foo et al. | 345/173 |
| 8,054,261 B2 * | 11/2011 | Pak et al. | 345/87 |
| 8,390,589 B2 * | 3/2013 | Hu et al. | 345/173 |
| 2005/0134772 A1 * | 6/2005 | Elman et al. | 349/117 |
| 2005/0162410 A1 * | 7/2005 | Johnson et al. | 345/174 |
| 2008/0130086 A1 * | 6/2008 | Malmstrom et al. | 359/265 |
| 2010/0110522 A1 * | 5/2010 | Jang et al. | 359/266 |
| 2011/0096388 A1 * | 4/2011 | Agrawal et al. | 359/268 |
| 2012/0105370 A1 * | 5/2012 | Moore | 345/174 |

OTHER PUBLICATIONS

Rosseinsky, D., et al., "Electrochromic Systems and the Prospects for Devices", Advanced Materials, vol. 13, No. 11, pp. 783-793, Jun. 5, 2001.

International PCT Search Report, PCT/PT2010/000035, 3 pages, Dec. 20, 2010.

* cited by examiner

ELECTROCHROMIC TOUCHSCREEN

CROSS-REFERENCE TO RELATED APPLICATIONS

This application is a U.S. National Stage Application of International Application No. PCT/PT2010/000035 filed Jul. 29, 2010, which designates the United States of America, and claims priority to Portuguese Application No. 104696 filed Jul. 29, 2009, the contents of which are hereby incorporated by reference in their entirety.

TECHNICAL FIELD

The present invention is in the field of electrochromism and of visualization and interface devices for electric and electronic apparatuses.

BACKGROUND OF THE INVENTION

Electrochromism is a phenomenon that is known since the XIXth century by indirect observation. In 1815 Berzelius observed that tungsten oxide showed chromatic variations when subjected to a reductive (redox) environment. Since then several authors have devoted themselves to the study of this phenomenon, until a first patent application regarding an electrochromic device has been filed in 1929.

Systems based in electrochromic materials display changes of color, color density or opacity rate in response to an electric current or field. The active agent, an electrochromic material, is responsible for the variation in color according to its oxidation state controlled by the potential difference which is imposed between two electrodes, in the case of the electrochromic redox process. Different electrochromic materials have been studied, academically and commercially, a diversity of compounds exist which range from simple organic and inorganic molecules to transition metal compounds and polymers, e.g., U.S. Pat. No. 3,819,252 dated Jun. 25, 1974.

The state of the art currently comprises applications in the field of visualization. Electrophoresis is a recent technology used by companies such as E-INK (www.eink.com). The present invention does not relate to electrophoresis.

Specifically, there is a development in the field of electrochromic visualization devices, for example the "wafer thin" color displays developed by Siemens.

Touchscreens date back to 1970, as seen in U.S. Pat. Nos. 3,662,105 and 3,798,370.

Current touchscreens are made of two different devices, working together: the visualization device, and the device which detects a touch via one of several technologies:
  detection of electric capacity variation in a capacitive film placed on the screen;
  activation of electric contacts at the touch point; or
  optical or sound triangulation.

There remains a need for a combined device that performs the combined function of visualization and touch detection.

The implementation of the visualization and touch detection functions into a single electronic structure is the basis of the present invention.

SUMMARY OF THE INVENTION

The present invention relates to a touchscreen, comprising an electronic visualization structure made of a deposition of layers of:
electrically conductive material; on which is deposited
electrochromic material, on which is deposited
electrolyte material, on which is deposited
electrochemically active material, on which is deposited
electrically conductive material;
wherein the electronic visualization structure is simultaneously an electronic detection structure, which touch detection depends on the continuous application of a modulated electric stimulus; and operates based on variations of the electric capacity of the electronic structure.

In one aspect of the invention, the electrochemically active material of the touchscreen is electrochromic.

In another aspect, the electrically conductive material of the touchscreen is deposited on a single continuous area.

In still another aspect, the electrically conductive material of the touchscreen is deposited on several areas, without direct continuity in between.

In another aspect, the electronic visualization structure is arrayed in a matrix, which matrix elements are electrically insulated from each other.

In another aspect, the visualization comprises static patterns only, which alternate between at least two optical states.

In another aspect, the visualization comprises dynamic patterns, which alternate between at least two optical states.

In still another aspect, the touch detection operates by measuring of signal frequency.

In another aspect of the invention, the touch detection operates by measuring of signal amplitude.

In another aspect, the touch detection operates by measuring the electric charge time.

In still another aspect, the touch detection operates by means of a modified Wheatstone bridge with variable capacitor.

BRIEF DESCRIPTION OF THE DRAWINGS

FIG. 4 illustrates an embodiment of a touchscreen comprising an electronic visualization structure wherein the electrically conductive material of the touchscreen is deposited on several areas, without direct continuity in between.

DETAILED DESCRIPTION OF THE INVENTION

An electrochromic device (also called electrochromic cell), defined by changing its optical state in response to the application of an electric stimuli, shows electric characteristics similar to those of a capacitor, which characteristics are common to technologies used in making touchscreens, specifically those based in measuring of electric capacity variations.

Figure 1:
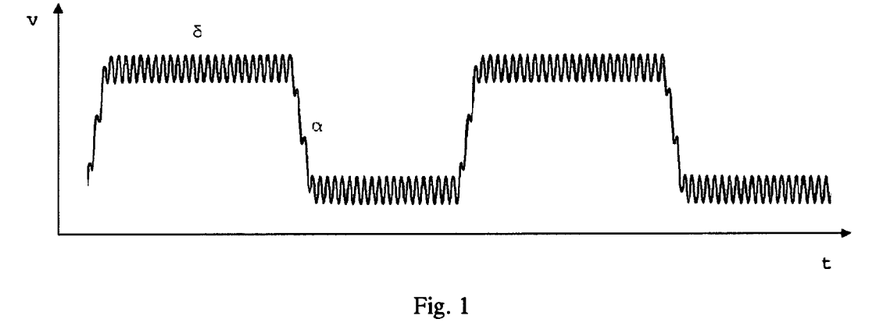
FIG. 1 depicts different voltage amplitudes for activation of a device embodying the present invention.

FIG. 1 depicts the several power amplitudes of a device that embodies the present invention. Periodically, δ variations in the applied voltage are applied. Signal δ is fed to the cell so as to allow the detection of electric capacity variations due to a cell touch event.

By feeding electrically a cell and touching it with a finger, an alteration in capacity was observed, which is of use in touch detection.

Figure 2:
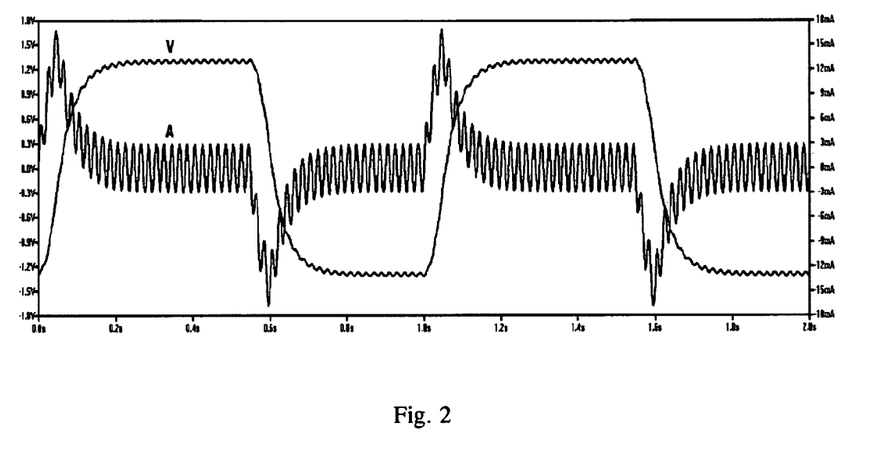
FIG. 2 depicts the variation of voltage, line V, and of current, line A, in a device embodying the present invention.

FIG. 2 depicts the variation of voltage and current in the cell as a change in coloring occurs. The depicted signals, of voltage and current, can be described as the sum of two signals of different frequencies: the lower frequency corresponds to cell coloring transitions; the higher frequency corresponds to the signal used for touch detection. The stable phases of the lower frequency signal correspond to color-unchanged phases, and the unstable phases correspond to color-change phases. Touching the cell with a finger increases its capacity. The increase of capacity of the electric circuit, made of the cell and the finger, will influence the transition time, the frequency and amplitude of the detection signal (that with the highest frequency), these variations being of use in touch detection.

The electrochromic device operates as a capacitor. Sensors connected to the electric material layers (electrodes) detect changes in electric capacity caused, e.g., through contact of a finger with the surface of the device. Control electronics trigger an electric action in response to the touch detection.

The methods for detecting changes in capacity include and are not limited to:
frequency measurement (FM);
amplitude measurement (AM);
charge/discharge time; and
Wheatstone bridge with variable capacitor.

Variations α in voltage, greater than δ, trigger the color change of the electrochromic material, including but not limited to, the transition between a colored and uncolored phase, as for example in the electrochromic materials based in inorganic oxides, e.g., tungsten trioxide ($WO_3$).

The voltage α applied to operate the coloration/de-coloration of the cells is in direct voltage. Superimposed to this voltage, there is alternating voltage δ which allows touch detection on the device.

Thus, a single device operates as a display, through the variations in color of the electrochromic material layer, and as touch sensor, through touch detection via the same electrodes which operate the electrochromic material.

In a preferred embodiment of the present invention, the electrochromic material is placed on a substrate, e.g. a cellulosic substrate, capable of conducting electric current. Other possible substrates include and are not limited to paper, plastic, textiles, wood and wood derivatives, cork, leather, glass and ceramic. The capacity of conducting electric current on the substrate constitutes a first electrode. This electrode may be obtained through the deposition of a conductive material on said substrate, such as, for example, ITO, ATO or other transparent conductive oxides (TCOs). The electrochromic material undergoes chromatic change when a potential α is applied between an electrode, to which the electrochromic material is associated, and a second electrode. Between the two electrodes, there is always at least one further material, electric insulator and ionically conductive—the electrolyte. To the second electrode, which may consist in one of the alternatives already described for the first electrode, there is associated an electrochemically active material, optionally an electrochromic material.

In another preferred embodiment of the present invention, the electrically conductive material is deposited in several areas, without direct continuity in between.

In another preferred embodiment of the present invention, a surface may be covered by electrochromic cells of minute dimensions and arrayed in a regular fashion on a surface, being controlled in a matrix and precise way, configuring an electrochromic visualization device having image update capability.

Again, a δ variation in voltage will be periodically applied to the electrochromic cell matrix, keeping it continuously charged. At least one sensor will be permanently connected to the electrochromic cell matrix. When a touch on the matrix occurs, e.g. with a finger, with more than one sensor it is possible to have information that allows to locate the touch on the matrix. This allows for a visualization device which can be continuously updated, and which, by means of control logic including computer programs, can dynamically use partial regions of the matrix to trigger the appearance of content including, but not limited to, the very configuration of the electrochromic cell matrix.

The visualization provided by the touchscreen of the invention may comprise static patterns only, which alternate between at least two optical states, or dynamic patterns, which alternate between at least two optical states.

Figure 3:
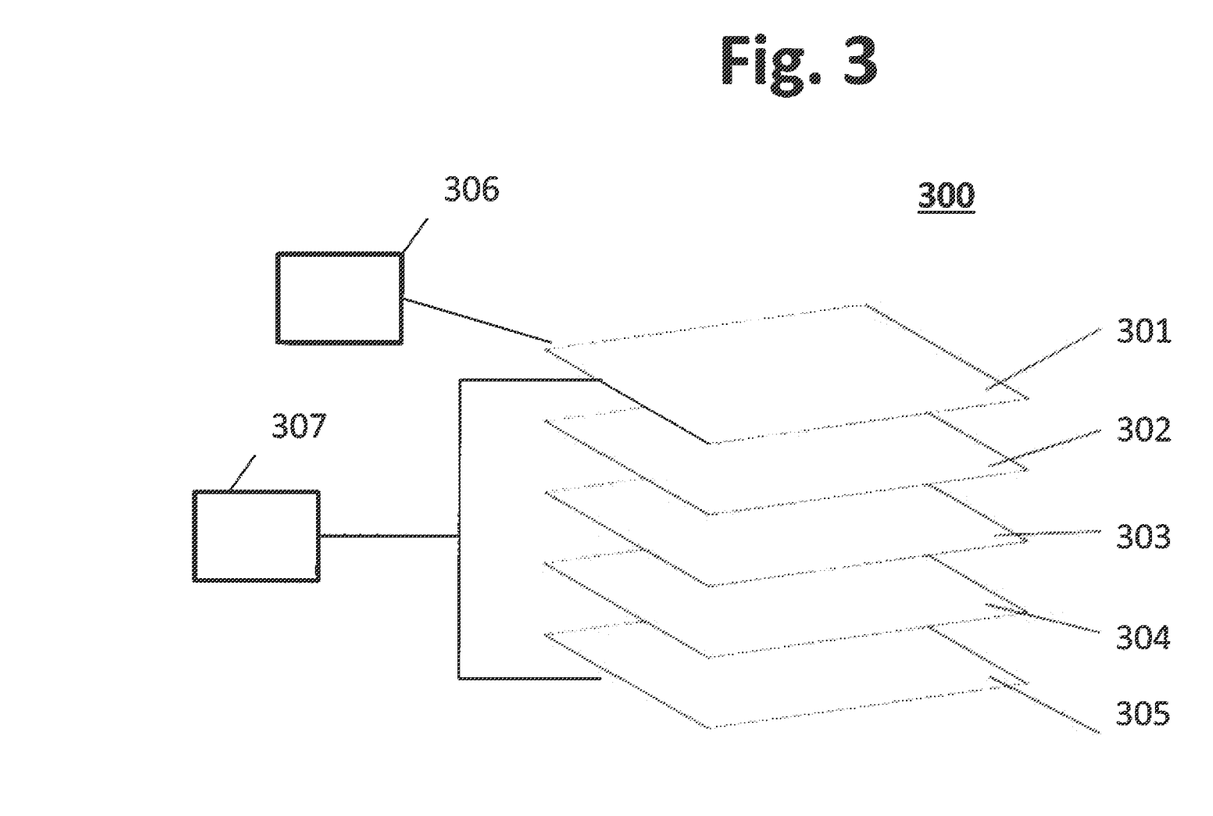
FIG. 3 illustrates an embodiment of a touchscreen comprising an electronic visualization structure made of a deposition of multiple layers.

FIG. 3 illustrates an embodiment of a touchscreen comprising an electronic visualization structure made of a deposition of multiple layers. Electronic visualization structure 300 comprises a layer of electrically conductive material 301 deposited on electrochromic material 302. Electrochromic material 302 is deposited on electrolyte material 303. Electrolyte material 303 is deposited on electrochemically active material 304. And electrochemically active material 304 is deposited on electrically conductive material 305. Electronic visualization structure 300 in this arrangement is also an electronic touch detection structure. The touch detection functionality depends on the continuous application of a modulated electrical stimuli and operates based on variations in the electric capacity of the electronic structure. Electronic visualization structure 300 further comprises a power source 306, which provides a continuous application of a modulated electrical stimuli to a layer of electrically conductive material (e.g., layer 301 or 305). Electronic visualization structure 300 additionally comprises sensor 307, which is configured to detect variations in the electric capacity of the electronic structure.

Figure 4:
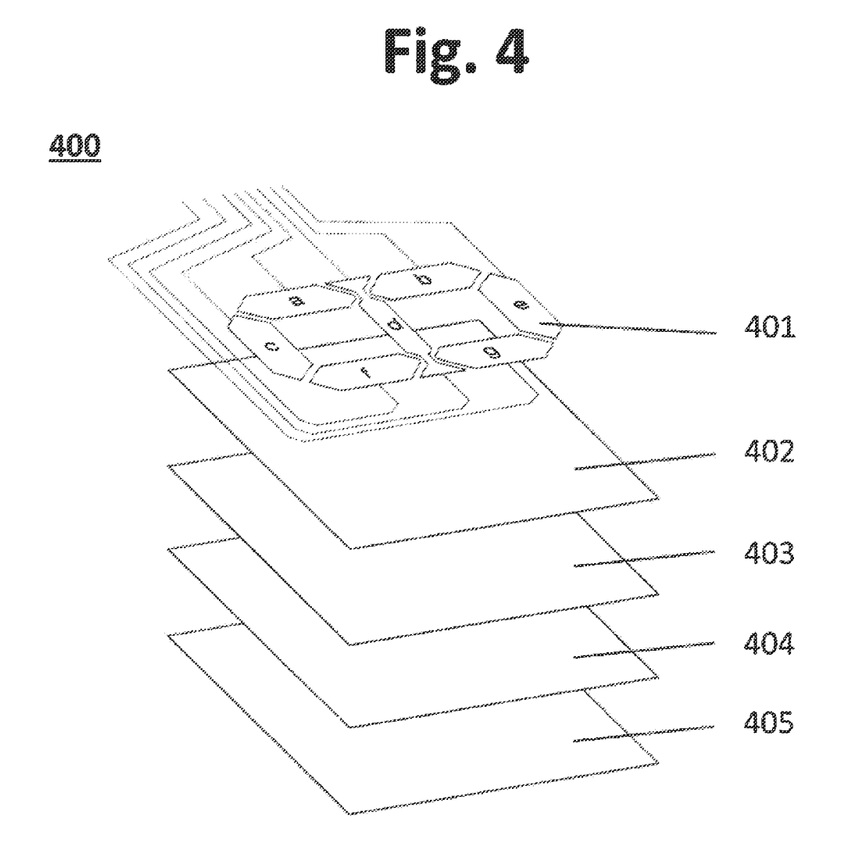

FIG. 4 illustrates an embodiment of a touchscreen comprising an electronic visualization structure wherein the electrically conductive material of the touchscreen is deposited on several areas, without direct continuity in between. Electronic visualization structure 400 comprises a layer of electrically conductive material 401 deposited on electrochromic material 402 on several areas (labeled a-e) without direct continuity in between. Electrochromic material 402 is deposited on electrolyte material 403. Electrolyte material 403 is deposited on electrochemically active material 404. And electrochemically active material 404 is deposited on electrically conductive material 405. Electronic visualization structure 400 in this arrangement is also an electronic touch detection structure.

Figure 5:
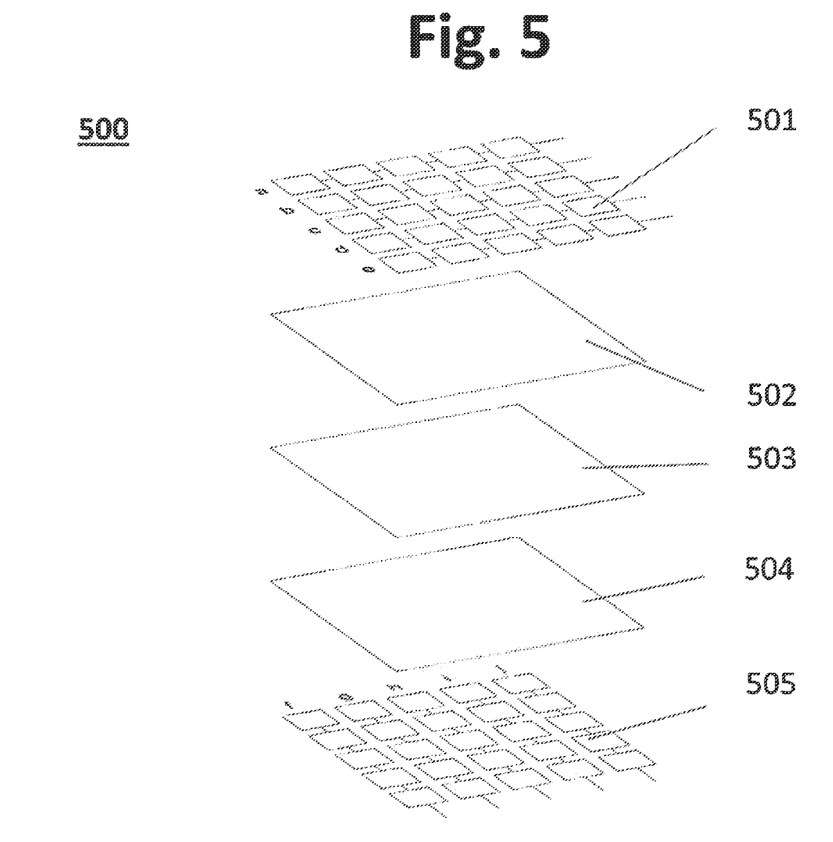
FIG. 5 illustrates an embodiment of a touchscreen comprising an electronic visualization structure arrayed in a matrix.

FIG. 5 illustrates an embodiment of a touchscreen comprising an electronic visualization structure arrayed in a matrix. Electronic visualization structure 500 comprises a layer of electrically conductive material 501 deposited on electrochromic material 502 in a matrix pattern of elements a, b, c and so forth. Matrix elements a, b, c, etc. are electrically isolated from each other. Electrochromic material 502 is deposited on electrolyte material 503. Electrolyte material 503 is deposited on electrochemically active material 504. And electrochemically active material 504 is deposited on electrically conductive material 505. Electrically conductive material 505 is arrayed in a matrix of elements d, e, f and so forth, each electrically isolated from the others. Electronic visualization structure 500 in this arrangement is also an electronic touch detection structure.

Figure 6:
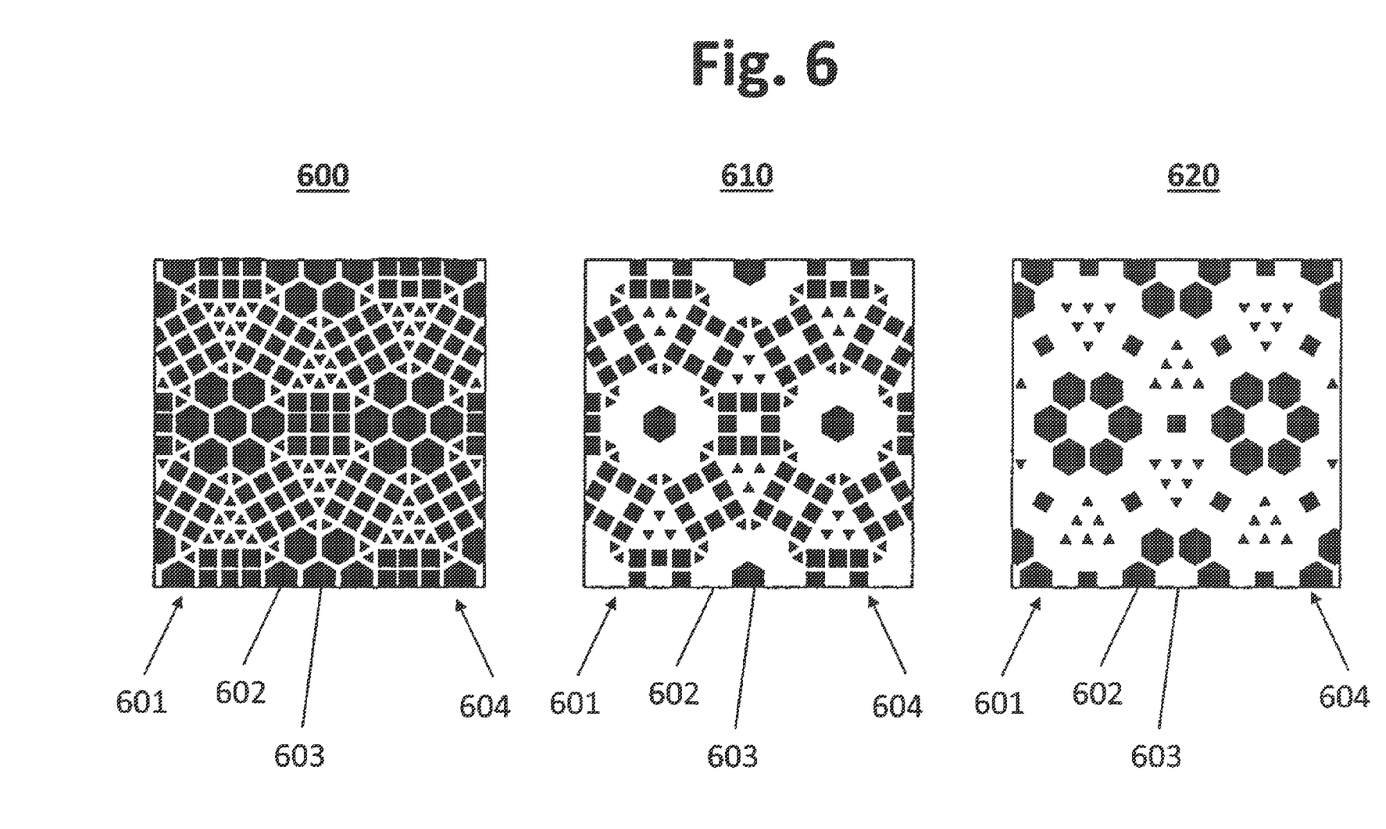
FIG. 6 illustrates an embodiment of a touchscreen comprising an electronic visualization structure comprising static patterns only, which alternate between at least two optical states.

FIG. 6 illustrates an embodiment of a touchscreen comprising an electronic visualization structure comprising static patterns only, which alternate between at least two optical states. Pattern 600 illustrates the static arrangement of electrically isolated elements 602 and 603 of electrically conductive material 601 (e.g., electrically conductive material 301 illustrated in FIG. 3). Pattern 610 illustrates certain elements (e.g., element 602) in a neutral state (e.g., OFF) and other elements (e.g., 603) in an active state (e.g., ON). Pattern 620 illustrates elements 602 and 603 in the opposite state illustrated in 610.

Figure 7:
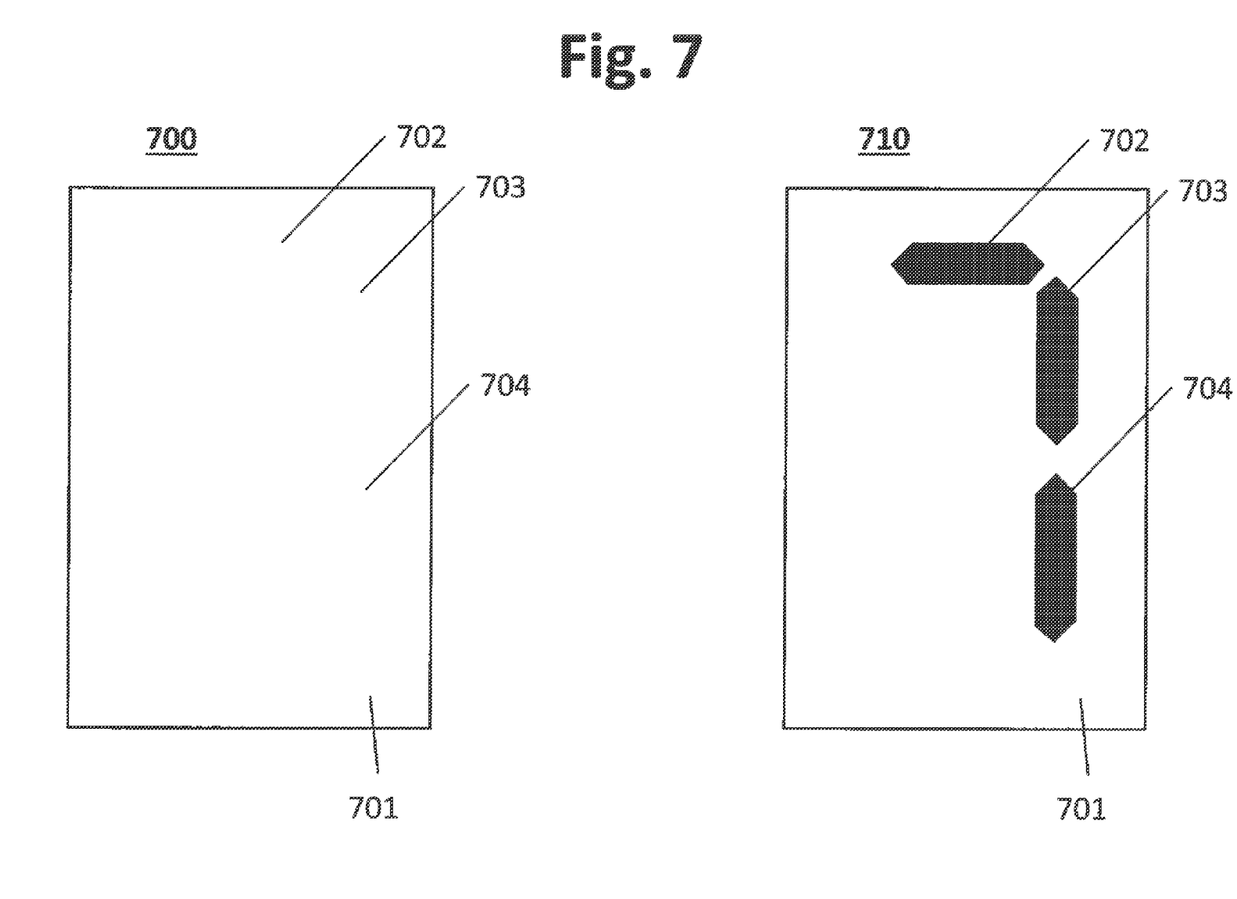
FIG. 7 illustrates an embodiment of a touchscreen comprising an electronic visualization structure comprising dynamic patterns, which alternate between at least two optical states.

FIG. 7 illustrates an embodiment of a touchscreen comprising an electronic visualization structure comprising dynamic patterns, which alternate between at least two optical states. Pattern 700 illustrates electrically isolated elements 702, 703, and 704 of electrically conductive material 701 (e.g., electrically conductive material 301 illustrated in FIG. 3). Elements 702, 703, and 704 are illustrated in a neutral state (e.g., OFF) in pattern 700. Elements 702, 703, and 704 are illustrated in an active state (e.g., ON) in pattern 710.

The invention claimed is:

1. A touchscreen, comprising an electronic visualization structure comprising:
   a first layer of electrically conductive material deposited on
   second layer of electrochromic material deposited on
   a third layer of electrolyte material deposited on
   a fourth layer of electrochemically active material deposited on
   a fifth layer of electrically conductive material;
   a continuous source of modulated electrical stimuli; and
   a sensor for sensing variations in the electric capacity of the electronic structure.

2. The touchscreen according to claim 1, wherein the electrochemically active material is electrochromic.

3. The touchscreen according to claim 1, wherein the electrically conductive material is deposited on a single continuous area.

4. The touchscreen according to claim 1, wherein the electrically conductive material is deposited on several areas, without direct continuity in between.

5. The touchscreen according to claim 1, wherein the electronic visualization structure is arrayed in a matrix in which each element of the matrix is electrically insulated from the other elements of the matrix.

6. The touchscreen, according to claim 1, comprising static patterns only, which alternate between at least two optical states.

7. The touchscreen according to claim 1, comprising several dynamic patterns, which alternate between at least two optical states.

8. The touchscreen according to claim 1, wherein the touch detection operates by measuring of signal frequency.

9. The touchscreen according to claim 1, wherein the touch detection operates by measuring of signal amplitude.

10. The touchscreen according to claim 1, wherein the touch detection operates by measuring of electric charge time.

11. The touchscreen according to claim 1, wherein the sensor comprises a modified Wheatstone bridge with a variable capacitor.

\* \* \* \* \*